United States Patent [19]
Bavaro et al.

[11] Patent Number: 4,977,351
[45] Date of Patent: Dec. 11, 1990

[54] EMERGENCY LIGHTING SYSTEM

[75] Inventors: Joseph P. Bavaro, Saugus; Frank M. Nigh, Andover, both of Mass.

[73] Assignee: Bavco Manufacturing Company, Inc., Saugus, Mass.

[21] Appl. No.: 158,778

[22] Filed: Feb. 22, 1988

Related U.S. Application Data

[63] Continuation-in-part of Ser. No. 933,266, Nov. 19, 1986, Pat. No. 4,727,291, which is a continuation-in-part of Ser. No. 787,611, Oct. 15, 1985, abandoned.

[51] Int. Cl.$^5$ .............................................. H02J 9/06
[52] U.S. Cl. ....................................... 315/87; 307/66; 315/86
[58] Field of Search .................... 315/86, 87, 129, 134; 307/64, 65, 66

[56] References Cited

U.S. PATENT DOCUMENTS 3,746,877  7/1973  Seiter et al. ......................... 340/333
3,869,639  3/1975  Herzog .................................. 315/86
4,188,661  2/1980  Bower et al. ......................... 315/205

Primary Examiner—Eugene R. LaRoche
Attorney, Agent, or Firm—Wolf, Greenfield & Sacks

[57] ABSTRACT

This is an emergency lighting system which permits at least one gas discharge lamp to be operated from an AC power source when AC current is present and from a battery when AC signal is not present. The circuit also provides the capability for turning the lamp on under other selected emergency conditions such as in response to an intruder detection, or in response to detection of smoke, heat, water, or some other emergency. In order to converse battery power in the DC mode, controls are also provided for turning off the light or reducing its output level in response to such control inputs as an ambient light detector or manually operated dimmer control. The system also provides a number of other improved features which cause the system to operate more efficiently than prior systems for performing the same function, thus providing greater energy to the lamp with the same source energy input, and reducing the heat generated by the system. Features are also provided for protecting the battery and other components against damage.

44 Claims, 11 Drawing Sheets

EMERGENCY LIGHTING SYSTEM

RELATED INVENTIONS

This application is a continuation-in-part of application Ser. No. 933,266 filed Nov. 19, 1986, which is, in turn, a continuation-in-part of application Ser. No. 787,611 filed Oct. 15, 1985 (now abandoned).

FIELD OF THE INVENTION

This invention relates to electrical systems for controlling lamps and more particularly to a system for normally operating gas discharge lamps from an AC line, while providing the capability for operating at least a portion of the lamps from a battery under selected emergency conditions.

BACKGROUND OF THE INVENTION

There are numerous applications where emergency lighting may be required or desired and many systems are currently on the market for providing and controlling emergency lighting. Typical applications of such systems are as a back-up when normal AC power fails. However, the need for emergency lighting may also arise in other applications such as when normal lighting is reduced by smoke, fog or other adverse ambient conditions, when intruders are detected, or the like.

The related applications indicated above describe several embodiments of a back-up or emergency lighting system which utilizes AC power to illuminate one or more gas discharge lamps under normal conditions and causes one or more of such lamps to be operated from battery power when AC power fails. In various embodiments of this prior invention (a) both lamps may be powered from a ballast when in the AC mode, with one of the lamps being powered from the battery through an inverter in the DC mode; (b) one lamp may be powered from a ballast in the AC mode and the other lamp may be powered from an inverter in both modes, the inverter receiving its input from the AC source through a DC power supply in the AC mode and from the battery in the DC mode; or (c) both lamps may be powered from inverters through DC power supplies in the AC mode, and one of the lamps from an inverter powered by a battery in the DC mode.

While the systems described above operate satisfactorily, there are a number or potential problems which can arise in an emergency system of this type which are not fully addressed by these prior art systems, and those systems responds only to the loss of DC power or changes in ambient light. This invention provides a substantial number of additional controls for the systems and provide additional or alternative circuitry for use in such a system which are intended to enhance the life and operation of the battery, to prevent burning out of the inverter under certain conditions, to make it easier to light a lamp with the inverter and to otherwise improve the operation of the system.

More particularly, in order to provide a compact unit, it is desirable to package the back-up battery in the fixture with the lamps and the other electronic components However, both the life and operating efficiency of most existing sealed rechargeable batteries are adversely affected by operating at high ambient temperatures, in particular temperatures in excess of 50° C. While various mechanical techniques can be utilized to isolate the battery or batteries from heat generating sources and to dissipate heat from the fixture, it is also desirable to eliminate components which generate heat from the system and to design the system in a manner such as to minimize the heat generated by the remaining components.

Another potential problem, particular for circuits which are designed to operate the emergency light from either a ballast in the AC mode and an inverter in the DC battery mode, is that high frequency ripples or spikes from the ballast may be transmitted to the switching power transistor or transistors of the inverter, overloading these transistors and burning them out. Various prior art techniques have been proposed for dealing with this problem, all of which involve either relay switching to take the inverter out of the lamp circuit when the lamp is being operated from the ballast or filtering techniques for the high frequency spikes. The relays are mechanical devices, are generally less reliable than an equivalent electronic device and are bulkier and more expensive; the filtering techniques have not proved fully satisfactory in dealing with the problem. A need therefore exists for an improved technique for dealing with the transmission of high frequency ballast signals to the inverter to avoid potential damage to the inverter transistors.

It is known that rechargeable batteries can be destroyed if they are charged beyond a certain point or discharged below a certain point and that the life of such batteries can be enhanced by minimizing the drain on the battery when in use. The related applications discuss techniques for controlling the charging of the battery to avoid overcharging, for monitoring the discharge of the battery and turning it off before the battery voltage drops below a critical level, and at least one method for reducing the drain on the battery by turning off the light when a selected ambient light level is detected. A need also exists for improved techniques for protecting the battery and other components in the circuit from potential damage when a lamp is burned out or is removed, removing the load from the circuit, and for reducing the load on the battery in other ways so that the lamp, at least in the DC mode, is only on when required and provides only as much light as is required. The drain on the battery, the heat generated by the inverter and the overall operating efficiency of the system may be enhanced by improving the control circuitry for the inverter and, in particular by reducing the power loss caused by the control circuit.

Finally, the utility of the system as emergency lighting may be enhanced by providing a circuit which may respond to emergency conditions in addition to the loss of AC power in order to activate the lamp. Examples of such emergency conditions include, but are by no means limited to, the detection of an intruder on the premises or the detection of smoke or fire.

SUMMARY OF THE INVENTION

In accordance with the above, this invention provides an emergency lighting system which has at least one gas discharge lamp, a source of AC power, means for normally operating the lamp with power from the AC source, a DC/AC inverter, and a rechargeable battery. A DC means is provided which is operative under selected emergency conditions for operating the lamp from the inverter with the inverter being powered by the battery and a plurality of controls are provided for the lamp at least when operated from the inverter One of the control signals is an AC signal. A means is provided for isolating the AC control signal from the signal to operate the lamp, said means also being responsive to the control signal for controlling at least the on/off state of the lamp. The isolating and control means may also be operative in response to selected controls for controlling the intensity of the lamp. Various ones of the controls may include an ambient light detector for turning the lamp off when ambient light exceeds a predetermined threshold, person detection means for turning a lamp on when a person is present, turning a lamp off when a person is not present, or both, selected emergency controls responsive to such conditions as fire or smoke which turn the lamp on when such condition is detected or a manually operated dimmer means which generates a suitable control signal Control signals which are intended to turn off the lamp may in fact be DC current sinks which are operative to draw off signals from controls adapted to turn the lamp on and thus override such controls. The inverter may operate the second lamp in both the AC and DC mode and may respond to an AC switch input through the isolator and control means to turn the lamp on when a control switch is operated.

The means for isolating and controlling may be positioned in a variety of places in the circuit relative to the inverter. For a first preferred embodiment, the inverter is a self-oscillating inverter having a feedback loop and the isolating and control circuit is in the feedback loop. For other embodiments of the invention, the isolating and control circuit is in the output of the inverter, between the inverter and the lamp, or in the input circuit of the inverter, between the inverter and its power supply. In the latter embodiments, the isolation and control means may be a solid state switch, such as a transistor switch, and may include an opto-isolator means. The circuit also includes a no-load protection means for the inverter. For preferred embodiments, the no-load protection means includes means connected in parallel with the lamp which means provides a minimum load to the inverter output at the operating frequency of the lamp, but provides a load to the inverter when there is an open circuit at the lamp, such as when the lamp is removed.

In various embodiments, at least two lamps are provided, both of which lamps may be operated from inverters when in their AC mode, both of which lamps may be operated from ballast when in their AC mode, or a first of the lamps may be operated from a ballast and the second lamp from an inverter in the AC mode. Only one of the lamps, for example the second lamp, is operated in the DC mode, being operated in all instances from an inverter. Where the second lamp is operated from a ballast in its AC mode, a means is provided for protecting the inverter from undesired signals from such ballast. Such means may include providing a lossy load to the undesired signal which load is substantially reduced at the frequency of the inverter signals. Such means may also include designing the circuit such that any undesired signals passing to the inverter is in a direction to disable the inverter, thus not causing damage thereto.

A starter strip may be provided in conjunction with the second lamp to reduce the voltage required to start the lamp and thus permit a single level inverter to be utilized to both start and operate the lamp. DC power to charge the battery and to drive the inverter may be obtained either from a transformer and DC power supply or from a step-down converter DC power source. In the latter instance, the step-down converter and inverter may be formed as an integral unit.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1:
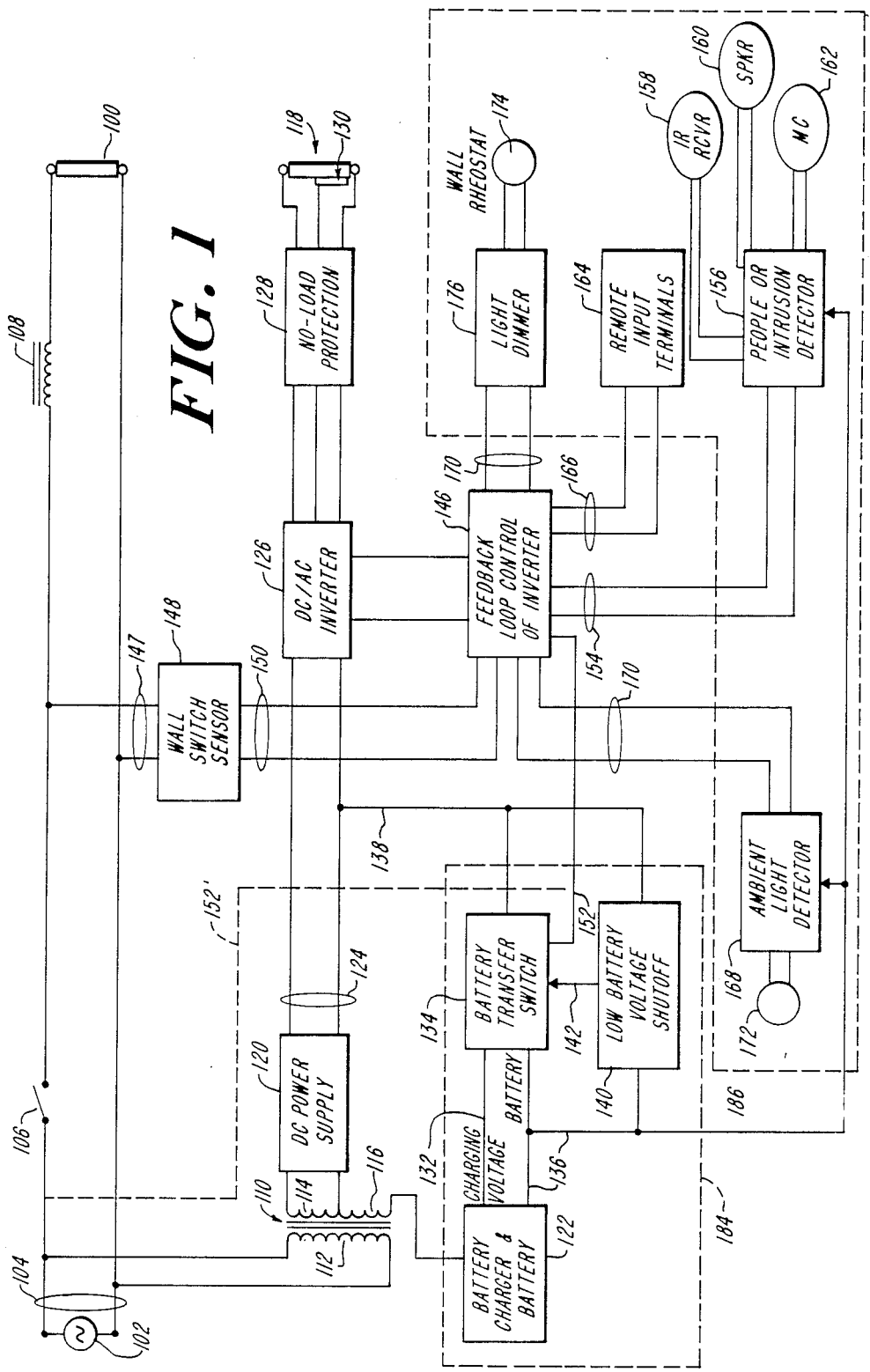
FIG. 1 is a schematic block diagram of an emergency lighting system of a first preferred embodiment of the invention.

Referring first to FIG. 1, an emergency lighting system is shown which, like the systems of the related applications, is adapted to drive a first gas discharged lamp 100 from an AC source 102 through lines 104, wall control switch 106 and a standard ballast 108. As used in this application, the term "gas discharge lamp" may include, but is by no means limited to, fluorescent lamps, mercury vapor lamps and high pressure sodium lamps. AC source 102 would typically be a standard electrical line which in the U.S. would be 60 cycle and either 120 volts or 277 volts. While switch 106 will be referred to as a wall switch, it may be any switch which is utilized for controlling the turning on and turning off of lamp 100. As in the related applications, lamp 100 and additional lamp 118 may be mounted in a fixture, lamp, or in any other suitable structure.

The signal on lines 104 is also applied to the primary winding 112 of a transformer 110. Secondary winding 114 of the transformer is connected to energize a standard DC power supply 120 while secondary winding 116 of the transformer is connected to the battery charger in circuit 122. DC power supply 120 may be a standard power supply for converting the line signal input, the voltage of which has been stepped down by transformer 110, to a signal of suitable DC voltage on lines 124 to operate DC/AC inverter 126. Inverter 126 may be a standard self-oscillating inverter having a feedback loop, the oscillating frequency of the inverter being determined in part by its load. The output from inverter 126 is connected through a no-load protection circuit 128 to operate gas discharge lamp 118. A starter strip 130 is provided to reduce, in a well-known fashion, the potential required to fire lamp 118, thus permitting an inverter 126 generating a single voltage output level to be utilized. If the starter strip was not utilized it might be necessary to use a more complex and expensive inverter to produce two separate voltages: a higher voltage to start the lamp and a lower voltage to operate it.

When battery charging voltage is being applied to circuit 122 from windings 116, a signal is applied over line 132 to battery transfer switch 134 This signal indictes that AC voltage is available from source 102. An output signal from the battery in circuit 122 is applied through line 136 to battery transfer switch 134. As will be described in greater detail hereinafter, battery transfer switch 134 is operative to pass the battery signal on line 136 to line 138 when the switch detects that signal is not present on line 132 (or is reduced below a specified threshold), indicating that there has been a loss (or the reduction below a specific threshold) of AC voltage from source 102. The signal on line 138 is applied through lines 124 to inverter 126 to energize lamp 118 and, if necessary, starter strip 130, in lieu of the signals from power supply 120. The signal on line 138 is also applied to low battery voltage shut-off circuit 140, which circuit, as will be described in greater detail later, is operative when the battery output voltage drops below a predetermined threshold, to generate an output signal on line 142 which is operative to open or disable switch 134, preventing further drain on the battery, thus preventing the battery from becoming overdischarged. Battery voltage on line 136 is applied to energize low-voltage circuit 140 and to also energize various control devices for the system.

More particularly, a number of controls are provided for the lamp 118 to permit it to be lit under selected conditions and to disable it under other selected conditions so as to avoid excessive drains on the battery. As previously indicated, inverter 126 has a feedback loop as part of its self-oscillating circuitry. Feedback loop control 146 represents a control circuit in the feedback loop of the inverter which is operative to close the feedback loop to permit the oscillator to generate a desired output or to partially or fully interfere with the operation of the feedback loop to reduce or eliminate output from the inverter The manner in which this circuit operates will be described in greater detail hereinafter. For purposes of the present discussion, it will be noted that there are two types of inputs to feedback circuit 146. The first type of input enables the inverter to convert the DC input on line 124 to an AC output to drive lamp 118. These controls include wall switch sensor 148 which determines that there is an AC signal on lines 104 at a point beyond switch 106, and thus that switch 106 has been closed. The AC input to switch 148 is isolated by the switch sensor to produce a DC output on lines 150 to feedback control circuit 146, enabling the inverter, when AC power is present and switch 106 is closed.

Similarly, battery transfer switch 134 generates a DC output on line 152 when the transfer switch is enabled to pass battery voltage to the inverter The signal on line 152 enables the inverter to operate with battery voltage input.

It is noted that in the circuit as shown in FIG. 1, switch 106 has no effect on lamp 118 when the circuit is operating in the battery mode. In many applications, this is a desirable feature since it assures that there will be emergency lighting without the need to grope for a switch when there is a power outage. However, this also results in a drain on the battery in circuit 122 during intervals when the user may have no need for emergency lighting and may in fact not even be on the premises. Thus, a dotted line 152' is provided which is an alternative connection for the line 152. Line 152', instead of being connected as an input to feedback circuit 146, is connected on the side of switch 106 opposite switch sensor 148. Thus, the output on line 150 may be caused either by AC signal from source 102 or DC signal from line 152 if switch 106 is closed. The problem with the alternative configuration for line 152 is that, in many areas, building codes prohibit running both an AC signal and a DC signal through the same switch In such areas, other means, some of which will be discussed later, may be provided for permitting a switch to control lamp 118 in both the AC and DC modes.

An additional input to feedback control 146 which causes lamp 118 to be illuminated may be output lines 154 from people and intrusion detector 156. While the specific nature of the circuit 156 does not form part of the present invention, and any one of a number of commercially available products may be utilized to perform this function, it has been found that such devices operate far more reliably if they employ two or more methods of detecting an individual rather than a single method. Thus, the inputs to detector 156 might include an infrared detector 158 and one or more ultrasound detectors, such as microphone(s) 162, broadcast by a speaker 160. Where circuit 156 is being used as an intrusion detector, the output signal from this device would be utilized to turn on the lamp when the lamp is not otherwise on, either in the AC or DC mode. Thus, even though switch 106 was open, so that no signal was present on line 150, the signals on line 154 would be operative to turn on lamp 118, alerting occupants that an intruder was present and providing illumination so that the intruder would be visible. When operating in the DC mode, detector 156 may also be utilized to conserve battery power when lamp 118 is, for example, being used to illuminate a door, hall or other source of ingress or egress. In such circumstance, the detector would serve as a sink in a manner to be described later to prevent illumination of lamp 118 until a person is detected in the area being illuminated. At such time, the sink signal from detector 156 would disappear, permitting lamp 118 to be lit from inverter 126 under control of the signal on line 152.

Remote input terminals 164 are also provided which may provide signals over line 166 in response to any desired input. For example, terminals 164 could be connected to the output of a smoke detector, a heat detector, a water or dampness detector, or some other sensor device which would indicate an emergency condition where extra lighting might be required. The turning on of lights under such an emergency might also alert the occupant of potential trouble.

The second type of input to feedback control circuit 146 are inputs which override previously received turn-on signals and disable the inverter to turn the lamp off when certain selected conditions occur, thereby conserving battery power. Examples of the second type of control include ambient light detector 168 which is connected to the feedback control circuit through lines 170. When ambient light exceeding a predetermined threshold is detected by sensor 172, circuit 168 becomes a DC current sink for control signals applied to feedback control circuit 146 and is thus operative to disable the inverter, causing lamp 118 to be turned off. Assuming the other control inputs are still present, the inverter 126 would become enabled again when sensor 172 indicated that the ambient light had fallen below the indicated threshold.

Similarly, a manual dimmer control 174, such as a rheostat, may be provided which is operative through circuit 176 and lines 180 to serve as a DC current sink for all or a portion of the turn-on signals to feedback control circuit 146. With dimmer control 174 partially down, the voltage output from inverter 126 will be reduced, reducing the drain on the battery and reducing the illumination output level from lamp 118. Control 174 may be turned all the way down, causing sufficient current to be drained from the feedback control loop to disable inverter 126, thus turning off lamp 118. Control 174 may thus serve as a DC control for lamp 118 when the lamp is operating in its DC mode and in this manner may perform substantially the same function as was performed by the line 152'. This, however, requires that there be two control switches for the lamp rather than one.

While there are various differences in the circuitry for the embodiments of the invention to be described hereinafter, all embodiments use the same battery and battery charger circuit 122, battery transfer switch 134 and low battery voltage shut-off circuit 140. These circuits have therefore been enclosed in a dotted box 184 which will be designated the battery, battery charger and control circuit in the remaining embodiment. Similarly, the various auxiliary controls within dotted box 186 may also be used with all of the embodiments of the invention to be described hereinafter. A single block labelled "Auxiliary Controls" is therefore shown in the drawings for the remaining embodiments which block may contain any one or more of the controls within the block 186 in FIG. 1.

Figure 2:
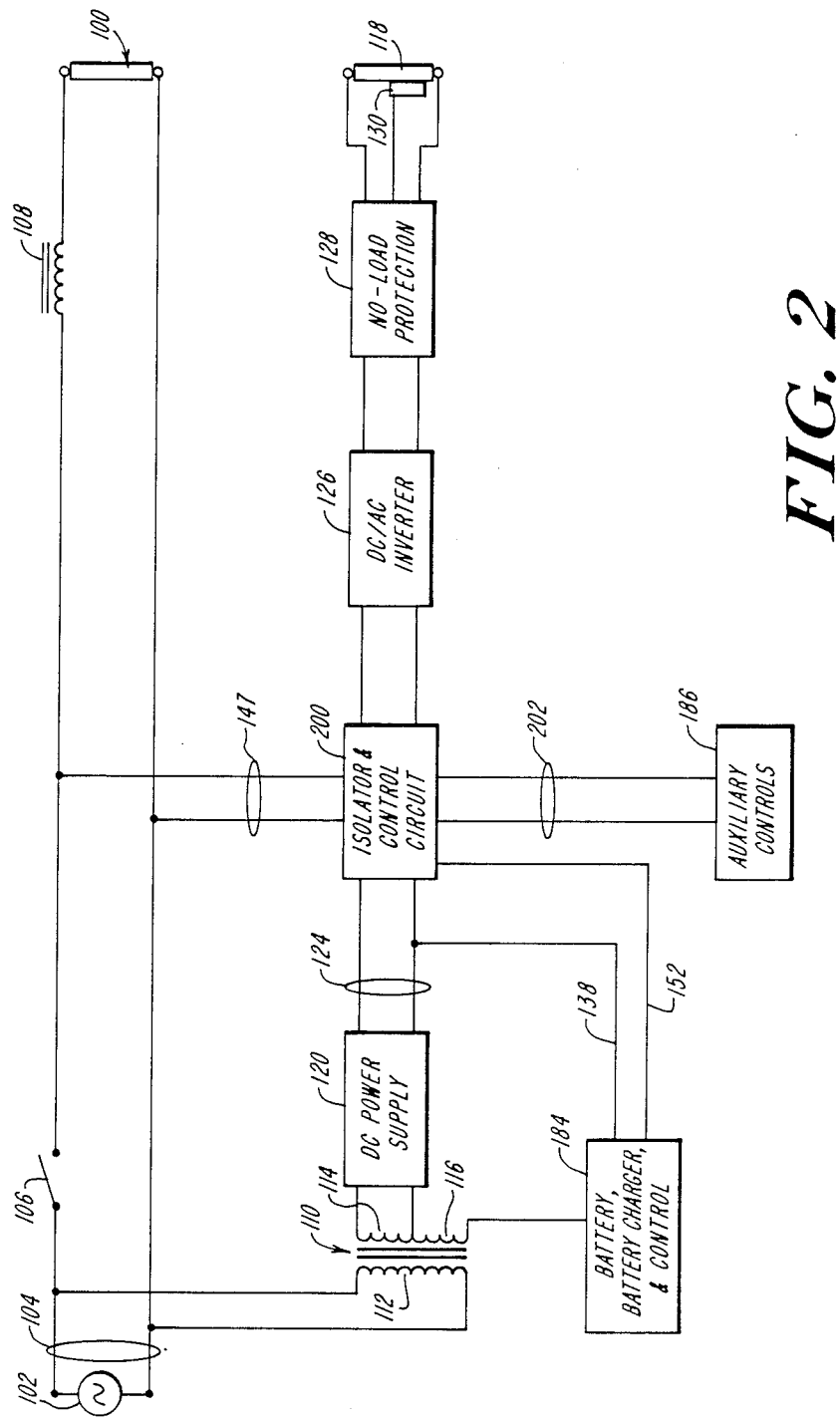
FIGS. 2, 3, 4, 5 and 6 are schematic block diagrams of various alternative embodiments of emergency lighting systems utilizing the teachings of this invention.
Figure 4:
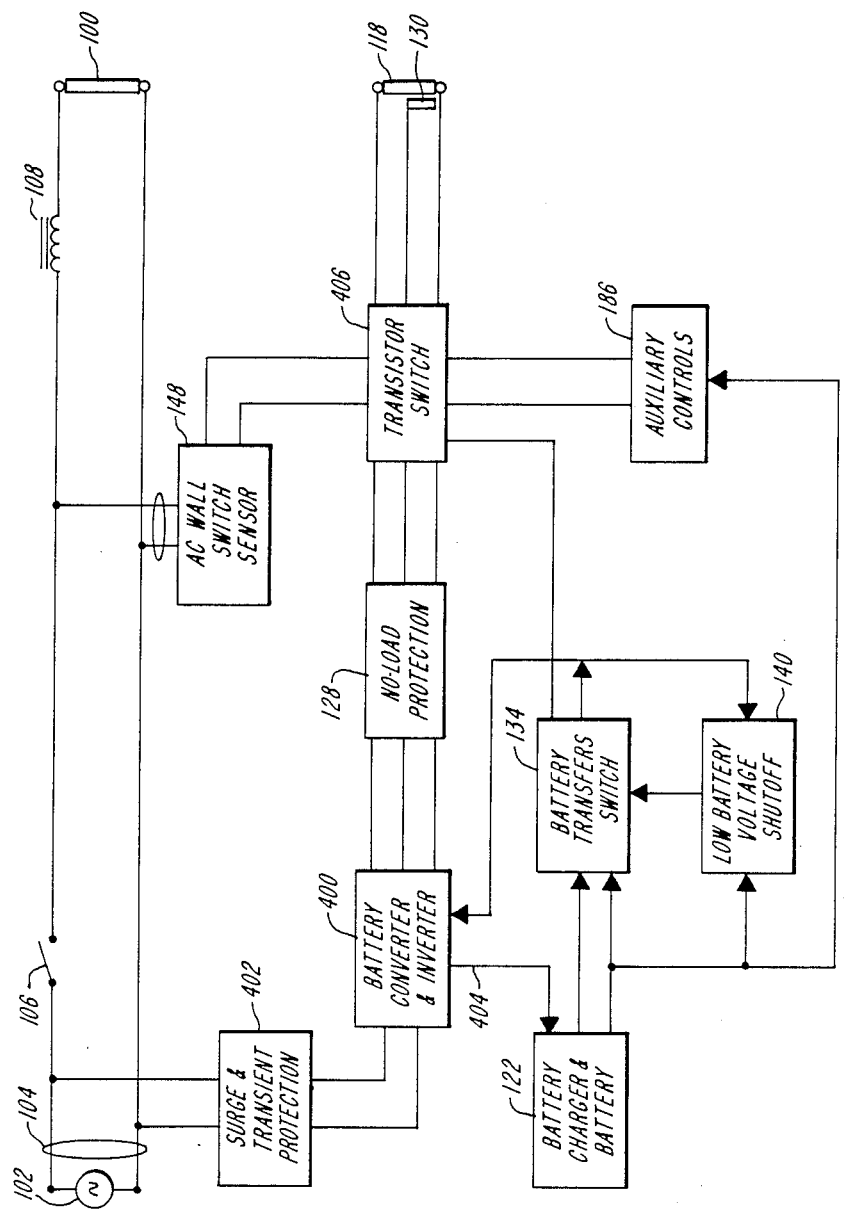

FIG. 2 shows an embodiment of the invention which is similar to that shown in FIG. 4 of the beforementioned Ser. No. 933,266 application, but incorporating some of the added features of this invention. The embodiment of FIG. 2 differs from that shown in FIG. 1 in that the control circuit for inverter 126 is from a solid state switch isolator and control circuit 200, rather than from the feedback loop control circuit 146. Circuit 200 is connected in series between the source of DC power on lines 124 and inverter 126, and is operative to either pass DC power to the inverter or block the passage of DC power to the inverter, depending on the control inputs to the circuit on lines 147, 152 and output lines 202 from auxiliary controls 186. The various controls function to either enable or disable inverter 126 in substantially the same way previously described for the embodiment of FIG. 1. While the embodiment of FIG. 2 is an operative one and one which may be utilized in some applications, it is not considered as desirable as the embodiments shown, for example, in FIGS. 1 and 4, because the circuit 200 at the input to the inverter causes a greater energy loss in the control circuit than does a control circuit placed in the feedback loop or the output of the inverter, thus resulting in a lower efficiency circuit and more heat. As previously indicated, an objective of this invention is to minimize the heat generated by the various components so as to hold down the ambient temperature for the battery.

Figure 3:
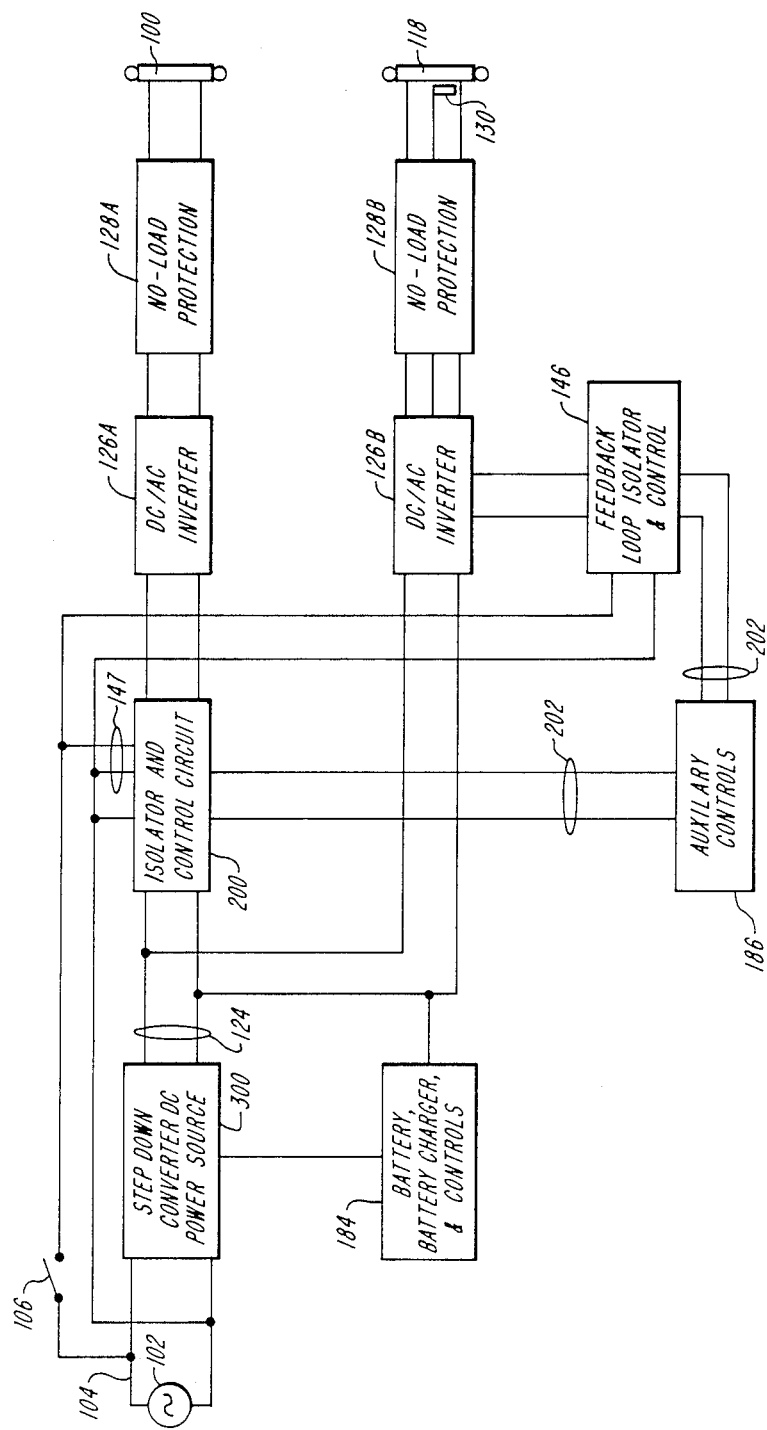
Figure 5:
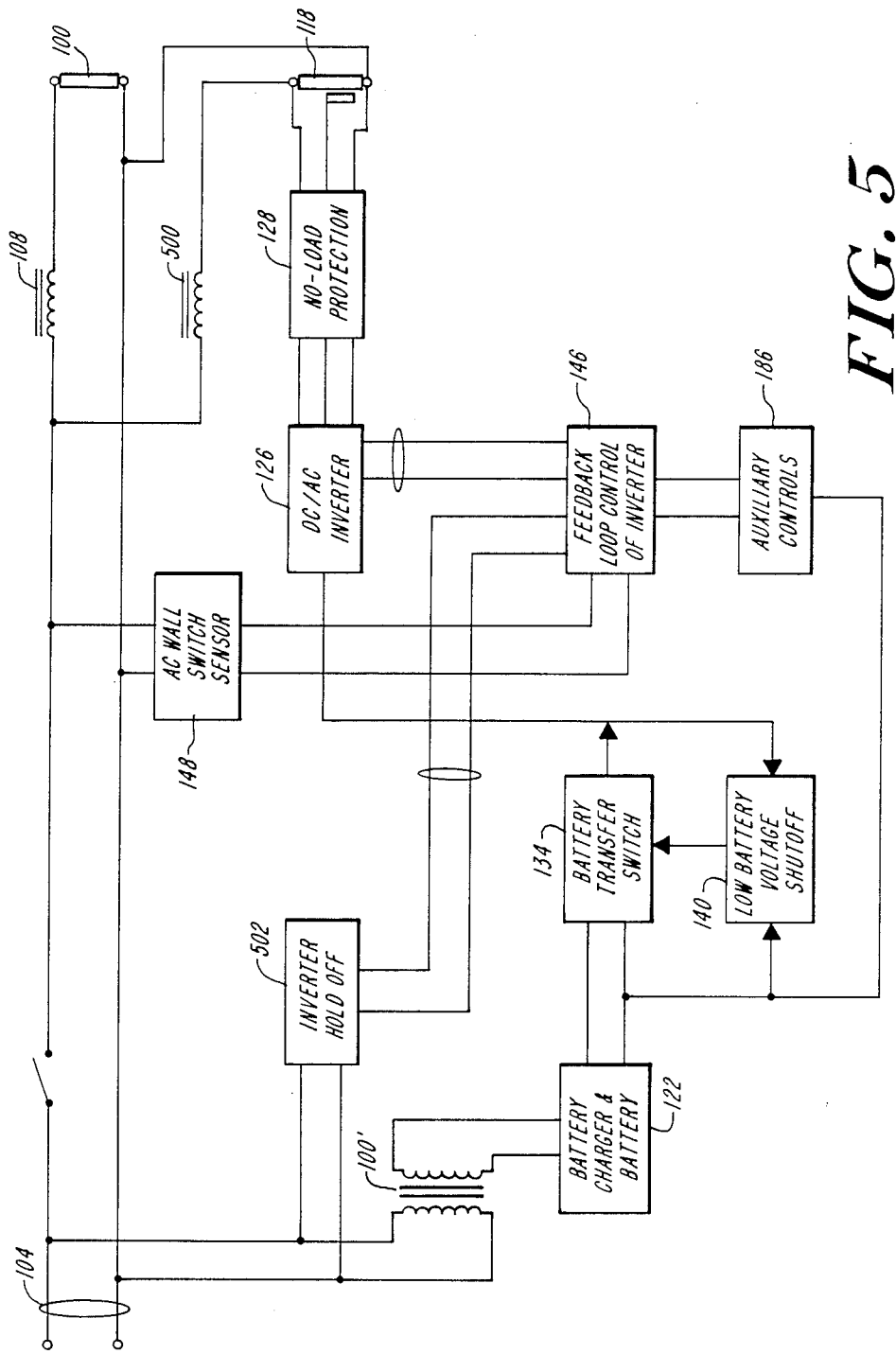

FIG. 3 shows an alternative embodiment of the invention which is similar to that shown in FIG. 5 of the beforementioned application Ser. No. 933,266 in that both lamp 100 and lamp 118 are being driven from inverters 126 in the AC mode rather than from a ballast. For purposes of illustration, one of the inverters, inverter 126A, is shown as being controlled by an isolation and control circuit 200 of the type shown in FIG. 2, while the other inverter, inverter 126B, is shown as being controlled from a feedback loop control circuit 146. The auxiliary controls 186 on lines 202 are shown connected to both control circuits. However, depending on the application, different controls may be applied to each of the control circuits and, in particular, since only lamp 118 operates in the DC mode, controls such as ambient light detection, which are designed to converve battery, may only be utilized with circuit 146 and inverter 126B.

The second major difference between the circuit of FIG. 3 and the circuits of the prior embodiments is that transformer 110 and DC power supply 120 have been replaced with a step-down converter DC power source 300, which generates the signals on line 124 to the inverters and also generates a DC charging signal for the battery on line 302. Circuit 300 which may be a standard circuit for performing this function, may be preferable to the transformer 110 and DC power supply 120 in that it operates at a higher frequency than the prior circuits, for example, 20-25 kh, and is therefore more efficient than such circuits, being smaller for comparable ratings and generating less heat.

Except for the distinctions indicated above, the circuit of FIG. 3 operates in all respects in the same manner previously described with respect to the circuit of FIG. 1.

FIG. 4 shows another embodiment of the invention which differs from previous embodiments in two respects. First, the step-down converter DC power source 300 has been replaced with a combined step-down converter and inverter 400 which receives AC power from line 104 through a surge and transient protection circuit 402. The circuits 400 and 402, which will be described in greater detail later in connection with the description of FIG. 13, convert the AC line signal on line 104 into a low voltage signal on line 404 which is applied to circuit 122 to charge the battery and a high frequency AC signal which is applied through no-load protection circuit 128 and transistor switch 406 to operate lamp 118 and starter strip 130. The use of a step-down converter for this embodiment of the invention has the same advantages over the use of a transformer and DC power supply previously discussed in the connection with the embodiment of FIG. 3. However, by combining the converter and inverter in the same circuit, the circuit provides the desired AC signal without multiple conversions. This results in a significantly more efficient circuit which is less expensive, more compact, provides more output for the same energy input and generates less heat. Surge and transient protection circuit 402 is required in this embodiment of the invention to prevent spikes, ripples and the like in the AC line signal from being applied to and burning out circuit 400, and in particular the power transistor(s) therein.

Figure 10:
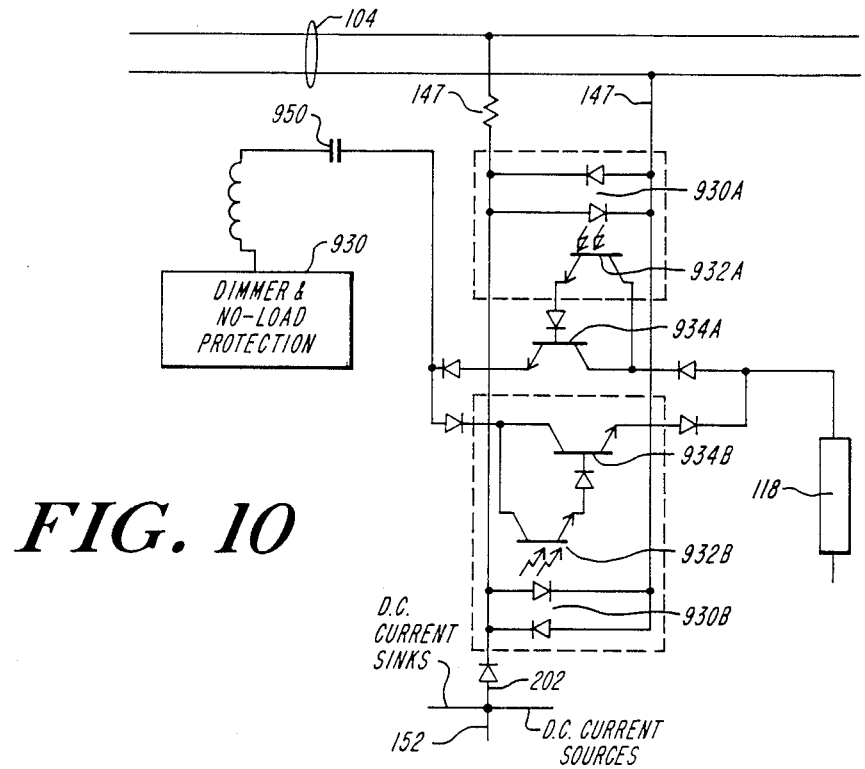
FIG. 10 is a schematic diagram of a transistor switch control suitable for use with various embodiments of the invention including the embodiment shown in FIG. 4.

The second difference between the embodiment of FIG. 4 and prior embodiments is that the isolation and control circuit in the form of transistor switch 406 is in the output of the inverter rather than in its input. The switch 406 along with wall switch sensor 148 for this embodiment of the invention are shown in FIG. 10 and described in greater detail in conjunction therewith. This circuit basically functions in the same manner as the circuit 200 in FIG. 2 to pass the AC signal to the output under control of the various control inputs. However, since this switch operates at a much higher frequency and at a much higher voltage than the switch circuit 200, it operates at much lower current and the power loss in this circuit is thus substantially less than for the circuit 200. The circuit is thus more efficient than the circuit 200, providing greater output and less heat for the same input.

FIG. 5 shows still another embodiment of the invention which differs from prior circuits shown in that a ballast 500 is provided to operate lamp 118 when it is operated in the AC mode. Thus, the lamps 100 and 118 operate in substantially the same manner in the AC mode. Since lamp 118 is operated from ballast 500 in the AC mode, a power supply from transformer 110 is not required to drive inverter 126 in this mode, the inverter only being utilized to drive lamp 118 in the DC mode. Thus, transformer 100' has only a single secondary winding which is connected to circuit 122' to charge the battery.

Further, since the inverter is not being used in the AC mode, an inverter holdoff circuit 502 is provided which is operative when an AC signal is present on lines 104 to serve as a DC current sink preventing any spurious turn-on of the inverter.

One potential problem with the circuit shown in FIG. 5 is that spikes, ripples or other undesired signals on the AC line which are passed by ballast 500 may be applied back to overload and thus burn out or otherwise damage inverter 126, and in particular the power transistor therein. In the prior art, this problem has been dealt with to some extent by either having relay contacts which open the circuit to the inverter when power is being applied through the ballast or by attempting to filter such undesired signals For reasons which have been discussed previously, neither of these solutions has proved satisfactory. Thus, as will be discussed in greater detail in conjunction with FIG. 12, the feedback circuit 146 and the transformer secondary circuit of the inverter are designed to provide a lossy load for undesired ballast signals and to assure that any such signals which do reach the power transistor of the inverter are of a polarity to turn the transistor off and well below its breakdown potential.

Except for the differences discussed above, the circuit of FIG. 5 operates in the manner indicated above to control the turning on and turning off of lamp 118 in response to various external controls.

Figure 6:
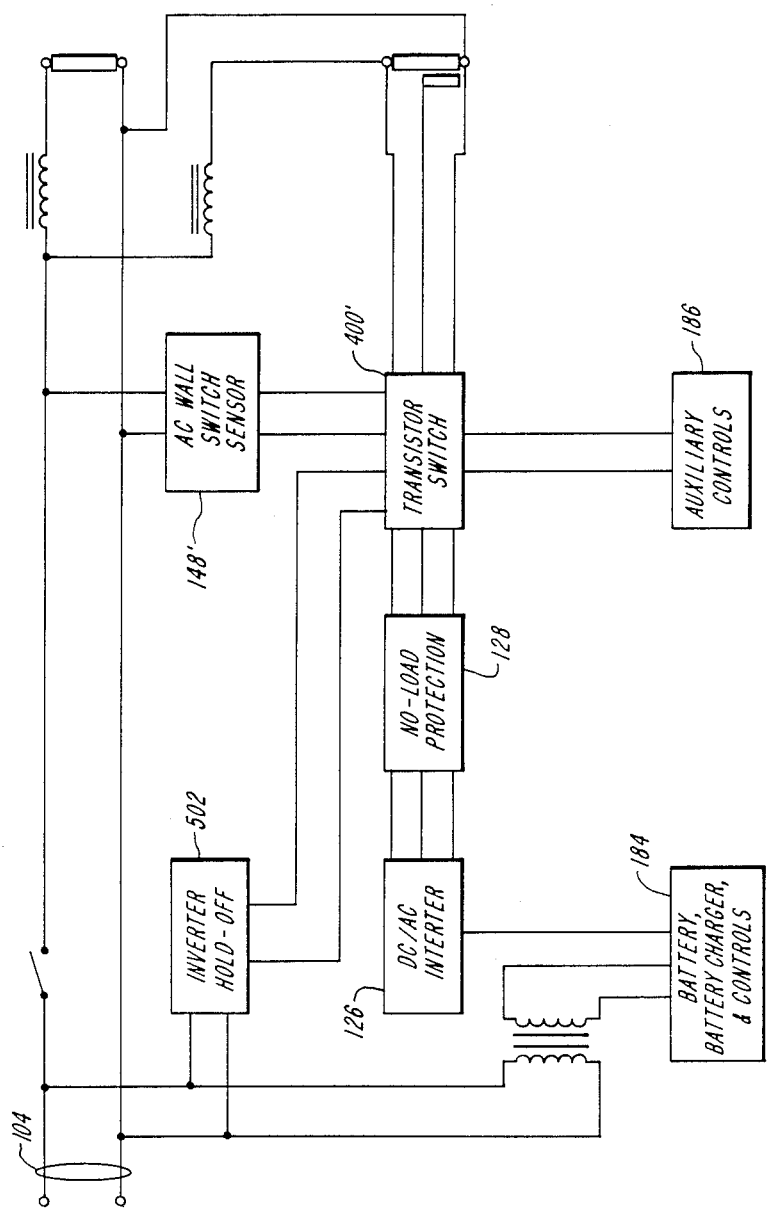
Figure 13:
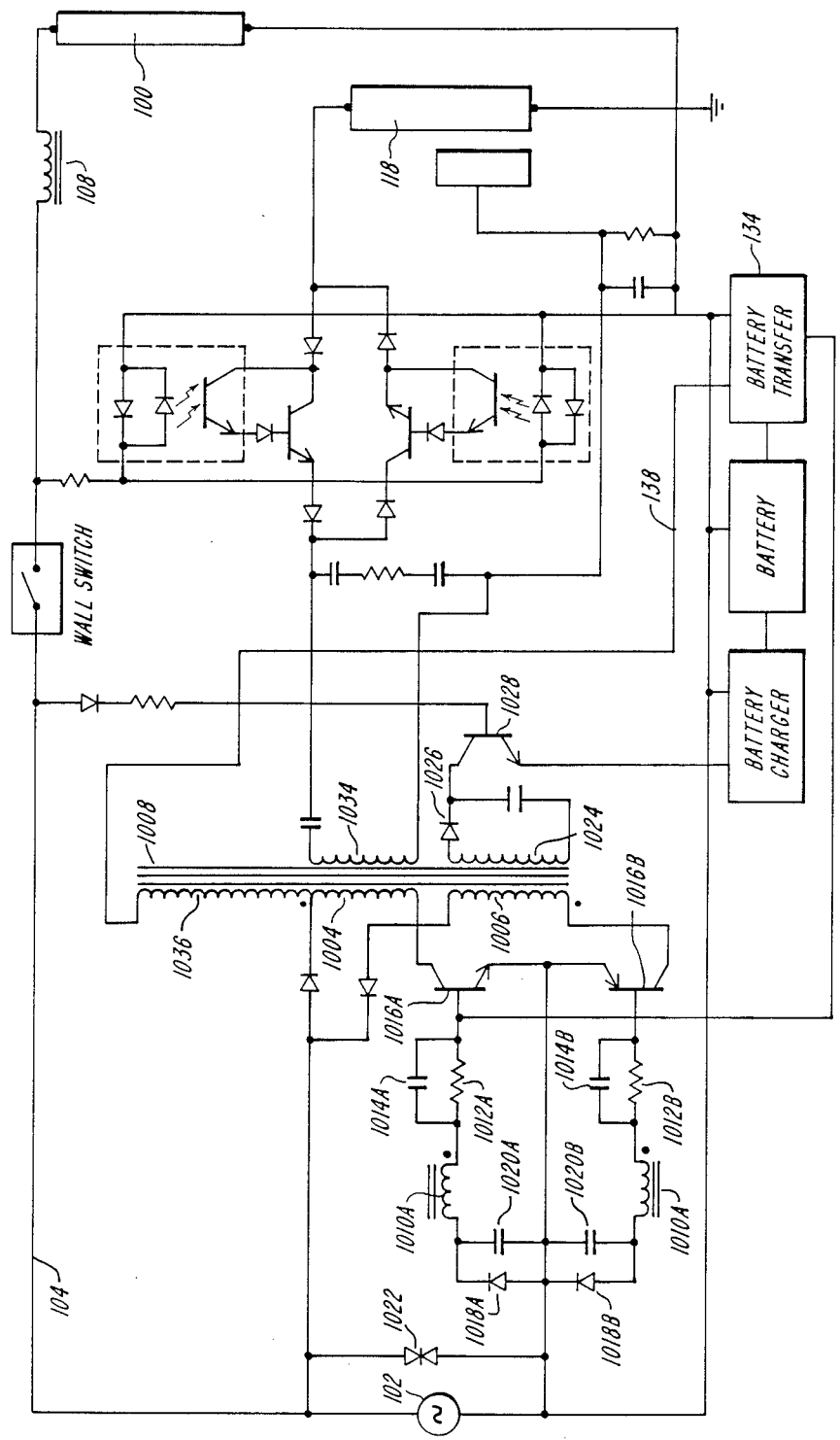
FIG. 13 is a schematic diagram of selected portions of the circuit shown in FIG. 6, including the inverter and transistor switch.

FIG. 6 shows still another embodiment of the invention which differs from the embodiment shown in FIG. 5 only in that the isolation and control circuit consists of a switch sensor and a transistor switch 400' rather than the feedback control circuit. Circuit 400' is of the general type utilized in conjunction with the embodiment of FIG. 4 and performs substantially the same functions as performed by these components in FIG. 4. The main difference between the embodiment of FIG. 6 and that of FIG. 4 is that the inverter is utilized only in the DC mode, not the AC mode, and thus an inverter holdoff circuit 502 is provided Circuitry for the sensor 148' and transistor switch 400' are shown in FIG. 13 and the manner in which these circuits operate, including how they operate to protect the inverter against spurious AC signals will be discussed in greater detail in conjunction with FIG. 13.

Figure 7:
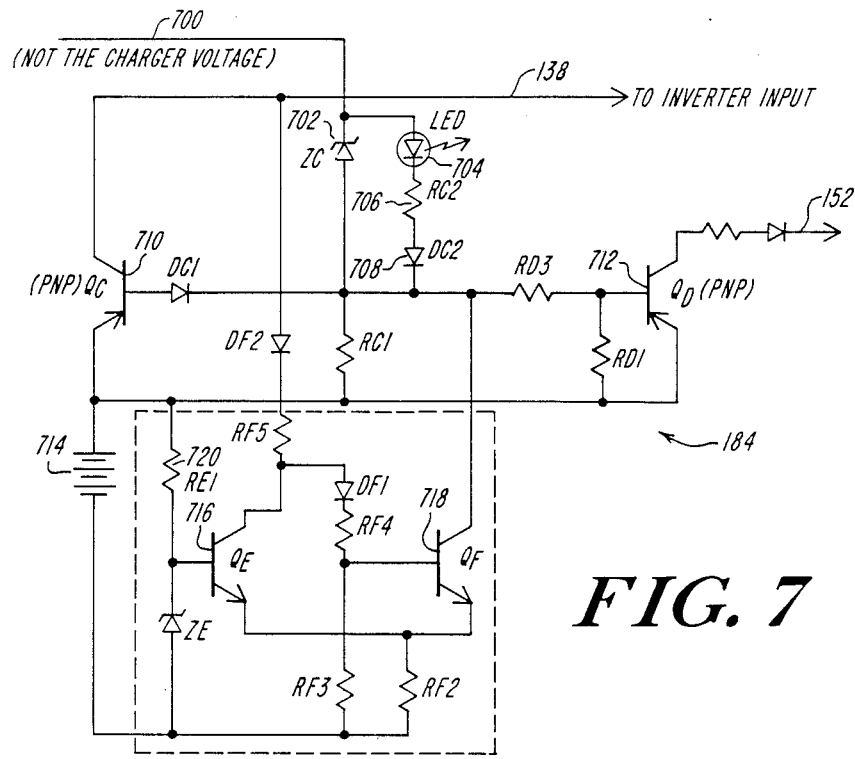
FIG. 7 is a semi-block schematic diagram of a battery, battery charger and control circuit suitable for use with various embodiments of the invention.

FIG. 7 is a schematic diagram of the battery, battery charger and control circuit 184 including battery transfer switch 134 and low battery voltage shut-off circuit 140. When AC signal is present, there is a charging signal on line 700 from, for example, winding 116 (FIG. 1) or step-down converter 300 (FIG. 3). The charging voltage passes through a parallel network consisting of zener diode 702 in one leg, and light-emitting diode 704, resistor 706 and diode 708 in the other leg. LED 704 provides a visual indication that the circuit is on. The fixed drop across zenor diode 702 assures that the potential at the base of transistors 710 and 712 are sufficiently above the battery potential at the emitters of these transistors so as to bias the transistors off. For example, the battery voltage would typically be 12 volts while the charging voltage might be 13.5 volts. Thus, so long as AC charging voltage is present, there is no DC signal applied by battery 714 to line 138, and there is no enabling control signal applied to line 152 from transistor 712. The DC mode is thus totally disabled.

Circuit 715 functions to charge the battery and to protect the battery against being overcharged. One circuit for performing this operation has been described in the related application. Other standard circuits for performing this function are also available.

When there is a loss of AC power so that a charging signal no longer appears on line 700, the potential ar the base of transistors 710 and 712 drops below the battery potential, causing both of these transistors to become conductive. This results, as previously indicated, in battery potential being applied through line 138 to the inverter (or to the switch for embodiments such as FIG. 2) and in a control signal being applied through transistor 712 to line 152. Signals will remain on lines 138 and 152 until either an AC charging signal again appears on line 700, cutting off transistors 710 and 712, or the battery drops below a predetermined threshold value, for example 85 percent of its rated potential, in which case low battery shut-off circuit 140 generates an output which turns off transistors 710 and 712. More particularly, when the circuit is operating in the battery mode, transistor 716 is conducting and transistor 718 is cut off, maintaining the basis of transistors 710 and 712 at a low enough potential for these transistors to remain conducting. When the battery potential drops below a selected value, the potential drop across resistor 720 is not sufficient to keep transistor 716 conducting. This transistor thus becomes cut off, turning on transistor 718. This raises the potential at the basis of transistors 710 and 712 to prevent further drain on the battery.

Figure 8:
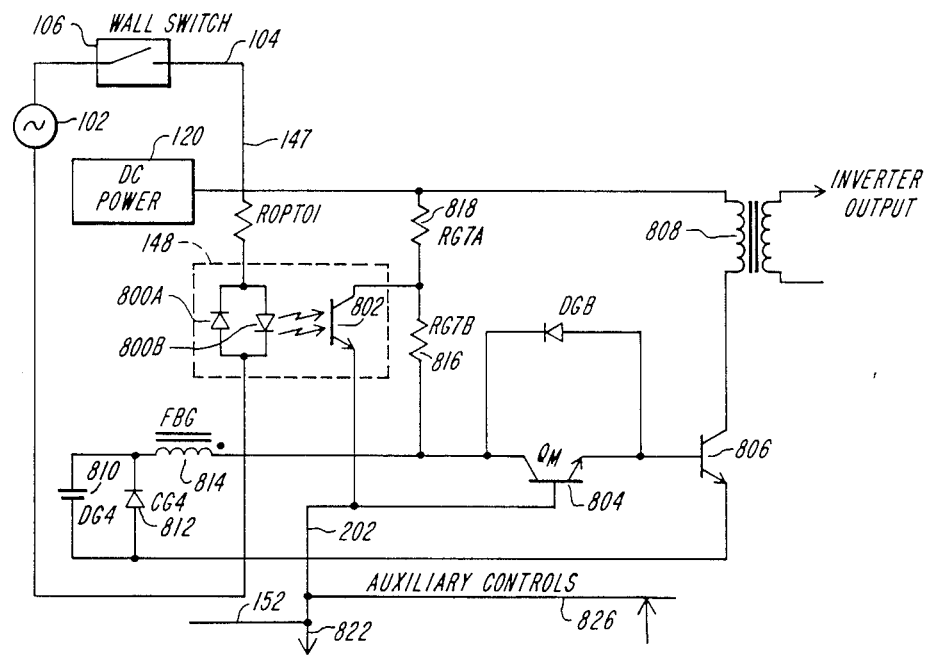
FIG. 8 is a simplified schematic diagram of a feedback loop control circuit suitable for use in various embodiments of the invention including the embodiments shown in FIGS. 1 and 3.

FIG. 8 is a simplified schematic diagram of the inverter 126, switch sensor 148 and related circuitry for an embodiment of the invention such as that shown in FIG. 1. For this embodiment of the invention, when wall switch 106 is closed, an AC signal from source 102 appears on line 147 which causes the light emitting diodes 800 in opto-isolator 148 to illuminate. The illumination of LEDs 800 causes current to flow in phototransistor 802, the emitter of which is connected to the base of transistor 804 to turn this transistor on. The output from transistor 804 is connected to energize the power transistor 806 of the inverter The feedback loop of the inverter consists of transformer primary winding 808, transistor 806, capacitor 810 and diode 812 connected in parallel, feedback winding coil 814 and resistors 816 and 818.

In addition to being turned on by the output from phototransistor 802, transistor 804 may also be turned on by a signal on line 152 from battery transfer switch 134 or by a signal on one of the lines 820 forming a part of cable 202 from an auxiliary control such as remote input terminal 164 or intrusion detector 156 which causes the light to be turned on. Thus, even though switch 106 is open, the inverter may still be enabled to convert power from DC power source 120 to operate lamp 118 if a selected emergency is detected.

Similarly, lines 822 of cable 202 lead to control devices which provide a DC current sink for control signals on line 202, causing transistor 804 to be cut off regardless of the presence of turn-on control signals on line 147, line 152, or line 820. Examples of devices serving as DC current sinks include light dimmer 176, ambient light detector 168 and possibly a people detector 156 in certain modes of operation previously described.

Figure 9:
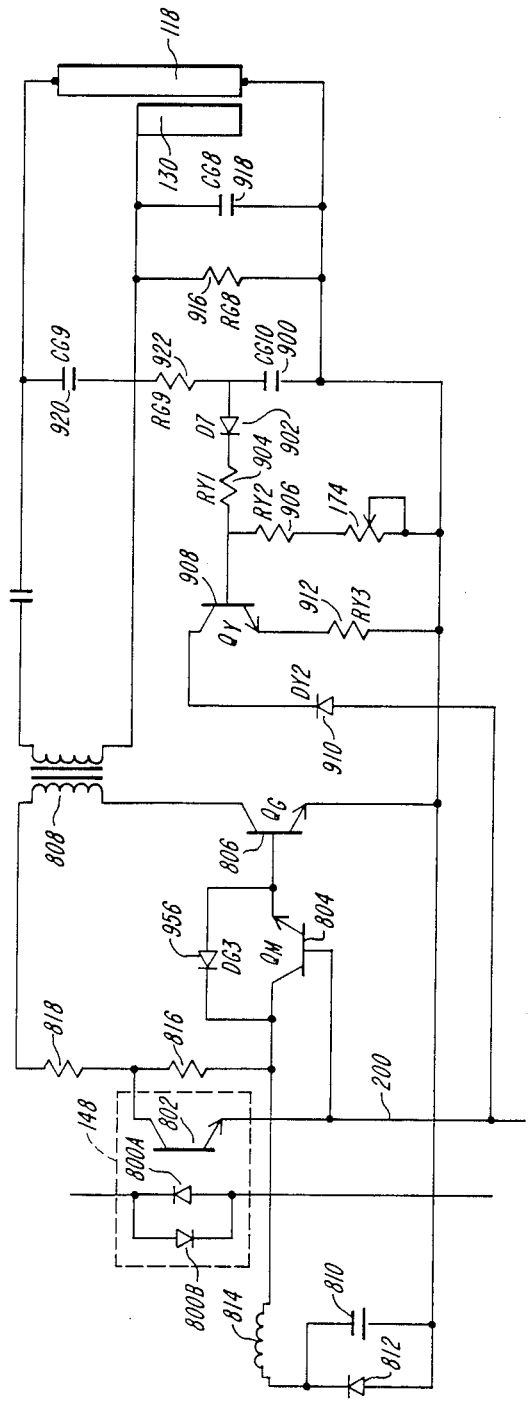
FIG. 9 is a schematic diagram of a no-load protection circuit and of a light dimmer control being utilized in conjunction with a feedback loop control of the type shown in FIG. 8

FIG. 9 is a schematic diagram showing among other things a light dimmer circuit suitable for use as the circuit 176 and how this circuit interacts with the inverter feedback controls to serve as a DC current sink. Capacitor 900 provides a measure of the voltage across lamp 118 which measure increases with the increase in frequency in the self-oscillating inverter output when lamp 118 is lit. This measured voltage is polarized by diode 902 and applied through a voltage divider network consisting of resistors 904 and 906 and rheostat 174 to the base of transistor 908. With the rheostat in its fully on position, i.e. in the position for the lamp 118 to be fully lit, transistor 908 is fully cut off preventing the flow of current therethrough. As the rheostat is turned down, the resistance of rheostat 174 increases, causing the drop across the rheostat to increase and thus increasing the potential at the base of transistor 908. This causes the transistor to become increasingly more conductive, draining current from cable 200 through diode 910, transistor 908 and resistor 912. This reduces the current flowing through the feedback loop and thus the output from the inverter, thereby dimming lamp 118 and reducing the load on the battery. Resister 912 permits transistor 908 to have a high input impedance when lamp 118 is not lit so that the dimmer does not load the circuit during the startup process.

FIG. 9 also illustrates the circuit for operating starter strip 130 and the no-load protection circuit. The potential on starter strip 130 is determined by resistor 916 and capacitor 918. Starter strip 130 is positioned adjacent to lamp 118 and is capacitively coupled thereto. During startup, the potential on strip 130 is midway between the potential across lamp 118, reducing, in a well known manner, the potential required to ignite the lamp.

The no-load protection circuit consists of capacitors 900 and 920 which are connected in series with resistor 922 therebetween, this series network being connected in parallel with lamp 118. The values of the capacitors are such that, at the high operating frequency of the fluorescent lamp, the circuit provides a sufficiently high impedance to the AC signal that little energy is lost through this circuit. However, if lamp 118 fails or is removed, the self-oscillating inverter oscillates at the higher frequency of the no-load circuit, permitting this circuit to provide a load to the inverter. As previously indicated, if a self-oscillating inverter does not have a load, there is a possibility that it will destroy itself. The no-load protection circuit also limits the voltage at the socket for lamp 118, protecting the user against shock from touching the socket during tube insertion or removal.

FIG. 10 shows a transistor switch suitable for use as the transistor switch in various embodiments of the invention where the transistor switch is in the output of the inverter, such as, for example, FIG. 4. For this embodiment of the invention, the AC signal from switch 106 on line 104 is connected through lines 147 to illuminate two pairs of light emitting diodes 930A and 930B. Thus, during each half cycle of the AC signal, when AC signal is present, one LED of each pair is illuminated to energize the corresponding phototransistor 932 to turn on the corresponding switch transistor 934. Thus, when AC signal is present, the switch is open to pass AC signal from the inverter to energize lamp 118.

Control signals may also be applied to the switch through line 202 and diode 936 to energize the switch. As previously discussed, some of the controls attached to line 202 may in fact be DC current sinks which, when present, cause lamp 118 to be turned off by serving as a DC current sink to the signals which would otherwise cause LEDs 930 to be illuminated. However, as can be seen in FIG. 10, in view of diode 936, these signals are not operative to prevent the illumination of lamp 118 when AC signal is present.

Figure 11:
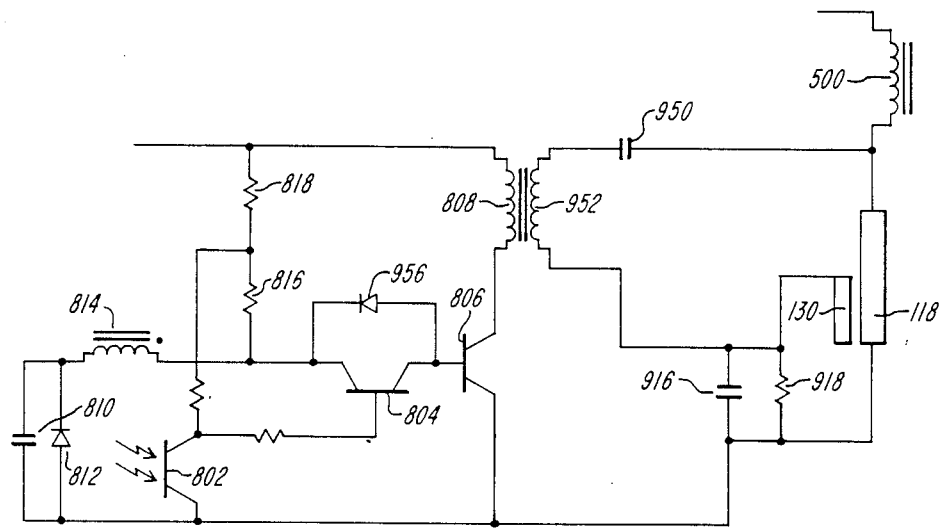
FIG. 11 is a schematic diagram of a step-down converter and inverter suitable for use with various embodiments of the invention including the embodiment shown in FIG. 4.

FIG. 11 shows a portion of the feedback control circuit and inverter output circuit for the embodiment of the invention shown in FIG. 5, and is included to illustrate how this embodiment of the invention functions to protect the power transistor 806 in the inverter from AC signals, and in particular, spike and ripple AC signals which may be applied from the AC line and ballast 500 through the inverter transformer to the transistor. The primary means for suppressing such signals is to provide a lossy path to ground for such signals through capacitor 916 and resistor 918. Since these components in parallel with the main AC circuit used to drive lamp 118, they do not load this circuit. Further, capacitor 916 is selected to provide a relatively higher impedance at the 6 to 10 KHz spike and ripple signals from ballast 500 thus causing most of these signals to pass through resistor 918. At the higher frequencies at which the lamp operates, i.e. above 20KHz, capacitor 916 is substantially a short circuit reducing the loss caused by this circuit when the system is in DC mode. Further, these components are designed to present a higher load path to ground for the higher frequency signals out of the inverter when the system is in the DC mode, so that they do not adversely affect the performance of the circuit in this mode.

Capacitor 950 tends to block any lower frequency signals, for example signals at 60 cycles and below from the AC line and prevent such signals from being applied to the inverter transformer. Higher frequency signals are routed through capacitor 950 and secondary coil 952 of the inverter transformer to ground through capacitor 916 and resistor 918.

To the extent signal is transmitted through the secondary coil of the transformer to the primary coil 808, it is applied through resistor 818 and resistors 816 to transistors 804 and diode 956 connected in parallel therewith. Diode 956 blocks the passage of signal in the direction to turn on transistor 806 from being transmitted to the transistor and passes the ballast signal in the direction to turn transistor 806 off. The breakdown potential of transistor 804 is greater than that of transistor 806, so that any back bias potential applied to transistor 806 will not be sufficient to cause any damage thereto. When opto-isolator transistor 802 is turned on it shorts to ground the current in the polarity to turn transistors 804 and 806.

The ballast signal through the secondary coil 814 from 952 is shorted by the opto-isolator transistor 802 is shorted to ground when AC power is present. The circuit is thus effective to completely protect power transistor 806 against any possible damage from the ballast without the use of relays to open the circuit.

Figure 12:
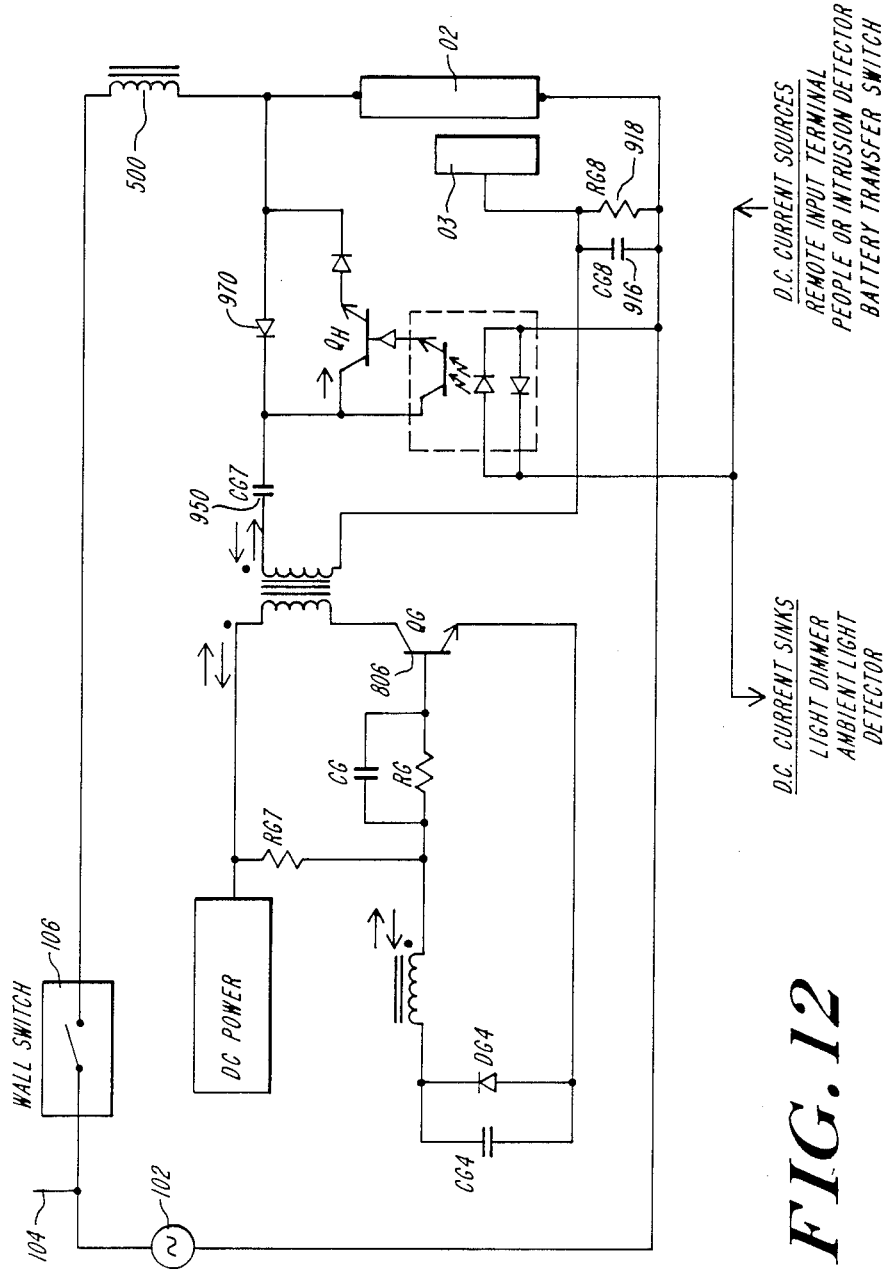
FIG. 12 is a schematic diagram of the feedback loop control of an inverter suitable for use with the embodiment of the invention shown in FIG. 5.

FIG. 12 is a partial block schematic diagram of a portion of the circuit shown in FIG. 6 which illustrates the operation of the transistor switch 400' for this embodiment of the invention, and also illustrates how this embodiment of the invention functions to protect power transistor 806 of the inverter against damage from spurious signals applied from the AC line from ballast 500, including any spikes or ripples on such line.

Unlike the transistor switch shown in FIG. 10, the transistor switch in FIG. 12 has a transistor control switch in only one direction, and has a diode 970 in the other direction. This means that when a sink signal is received from, for example, the ambient light detector or the light dimmer, these signals are effective to prevent the passage of signal to the lamp during only one half a cycle. Normally, the absence of signal during a full one half cycle will be sufficient to cause the lamp to be cut off, although it might take several cycles for this to occur. This permits a reduced number of components in the switch, and thus makes the switch simpler and less expensive.

The change in the transistor switch also means that there is only a diode 970 in the circuit in one direction. As with the embodiment of the invention discussed in conjunction with FIG. 11, capacitor 950 is effective to block all but higher frequency signals from the AC line and ballast 500, for example, signals in excess of 60 cycles. Further, diode 970 is effective to block any transient signals which might occur in the circuit which would tend, when projected through the inverter transformer, to turn power transistor 806 on. Thus, the signals projected back through the transformer, are only in a direction to turn power transistor 806 off. Capacitor 916 and resistor 918 serve in the same manner discussed with respect to FIG. 12 to provide a moderately lossy path to ground for the spurious signals from ballast 500. As previously indicated, with such signals, which are generally in the 6 to 10 kh range, most of such signal passes through resistor 918. Conversely, at the frequency at which the lamp operates capacitor 916 provides a substantial short circuit, providing very little loss across resistor 918, so that the circuit is not loaded by these components when the inverter is operating the lamp in the DC mode.

FIG. 13 illustrates a circuit such as that shown in FIG. 4, including in particular details of the surge protection circuit 402 and step-down converter and inverter circuit 400 used therein. Referring to FIG. 13, it is seen that signals from AC source 102 are applied through diodes 1000 and 1002 respectively, which diodes are poled in opposite directions, to primary coils 1004 and 1006 of transformer 1008 in the converter/inverter 400. There are two feedback loops provided for the self-oscillating inverter portion of the circuit. Each path includes a feedback coil 1010, a resistor 1012 connected in parallel with a capacitor 1014, a power transistor 1016, which is connected at its collector to one side of a primary winding and a diode 118 and capacitor 120 connected in parallel. A varister 1022 is connected across AC source 102 and serves as the surge protector 402.

The converter/inverter 400 serves two functions, one being to rectify the AC input to provide a signal on line 404 to charge the battery, and the other being to step up the frequency of the AC signal to the frequency necessary to drive lamp 118. The first function is accomplished through output coil 1024 which is rectified by diode 1026. The output from diode 1026 is passed through transistor 1028, which transistor is turned on to pass signal to line 404 when there is AC signal on line 104. The AC signal on line 104 is passed through diode 1030 and resistor 1032 to the base of transistor 1028.

The second function is performed by secondary coil 1034 which is connected through no-load protection circuit and a transistor switch which are substantially the same as those shown and described with respect to previous figures to energize lamp 118.

When AC signal is not present, battery transfer switch 134 passes a DC signal output on line 138 which is applied to primary coil 1036. Since AC signal on line 104 is not present at this time, transistor 128 is cut off, preventing battery charging current from being applied to the battery, and thus avoiding an extra drain on the battery The DC signal applied through coil 136 provides energy to the tank circuits which cause an signal on coil 1034 at the desired AC frequency.

An emergency lighting system has thus been described which is adapted to provide light as desired when AC signal is present, to provide backup lighting from a DC battery source when AC signal is not present, and which has the capability to turn on at least one lamp under selected emergency conditions, and to cause the light to be turned off to conserve battery power under other selected conditions. While for the various embodiments of the invention described above, two lamps have been shown, one of which operates only in the AC mode and the other of which operates in both the AC and DC modes, it is apparent that the teachings of this invention could be practiced with only a single lamp which operates in both the AC and DC mode, and that additional lamps could be provided which operate only in the AC mode or in both modes. Limitations on the number of lamps which can be employed include space in the fixture, heat which can be dissipated from the lighting device so that the lights do not cause excessive ambient temperature which might damage the battery, and the energy capacity of the battery to illuminate lamps in the DC mode.

While the invention has been shown and described above with respect to a number of different embodiments, it will be apparent to those skilled in the art that the foregoing and other changes in form and detail may be made therein by one skilled in the art without departing from the spirit and scope of the invention.

What is claimed is:

1. An emergency lighting system for providing illumination from AC power in a normal mode and for providing illumination from a battery in an emergency mode, said system comprising:

at least one gas discharge lamp;
a first DC/AC inverter connected to said lamp;
a DC power supply responsive to said AC power for generating DC power;
inverter control means responsive to an AC control signal and to a plurality of controls for controlling said first inverter to operate said one lamp from said DC power supply in said normal mode and from said battery in said emergency mode;

a light switch having an open position for manually turning off said one lamp in said normal mode said light switch being connected to said AC power to provide switched AC power; and means responsive to said switched AC power for generating said AC control signal to turn off said first inverter when said light switch is in said open position.

2. An emergency lighting system as claimed in claim 1 wherein a selected one or more of said controls are operative to control the intensity of said one lamp.

3. An emergency lighting system as claimed in claim 1 wherein said controls include an ambient light detector, and means responsive to said ambient light detector for generating a signal which is operative to turn off one lamp when the ambient light exceeds a predetermined threshold.

4. An emergency lighting system as claimed in claim 3 wherein the means responsive to the ambient light detector is a DC current sink which is operative to drain the DC signal from any of said controls which would be operative to turn on said one lamp.

5. An emergency lighting system as claimed in claim 1 wherein said controls include means for detecting that a person is present within a selected area of said lamps.

6. An emergency lighting system as claimed in claim 5 wherein said controls include means responsive to a detection by said detection means for generating a signal which is operative to turn on at least said one lamp.

7. An emergency lighting system as claimed in claim 5 wherein said controls include means responsive to a non-detection by said detection means for providing a DC current sink which is operative to drain the DC signal from any of said controls which would be operative to turn on said one lamp.

8. An emergency lighting system as claimed in claim 1 wherein said controls include means for detecting a selected emergency condition, and means responsive to detection by said detection means for generating a signal which is operative to turn on at least said one lamp.

9. An emergency lighting system as claimed in claim 1 wherein said controls include means for generating a signal which is operative to dim said one lamp.

10. An emergency lighting system as claimed in claim 9 wherein the means to dim includes a manual control means.

11. An emergency lighting system as claimed in claim 9 wherein said means operative to dim is a DC current sink which is operative to drain the DC signal from any of said controls which would be operative to turn on said one lamp.

12. An emergency lighting system as claimed in claim 1 including a step-down converter DC power source;

means for applying said AC power to said step-down converter; and means for utilizing the output from said step down converter to drive said inverter.

13. An emergency lighting system as claimed in claim 1 wherein said inverter control mode mean includes means for generating a control signal to enable said inverter.

14. An emergency lighting system as claimed in claim 1 wherein said inverter is an oscillating inverter having a feedback loop circuit; and wherein said inverter control means is in said feedback loop circuit.

15. An emergency lighting system as claimed in claim 1 wherein said inverter control means includes a solid state switch means between the inverter and the one lamp.

16. An emergency lighting system as claimed in claim 15 wherein said switch means is a transistor switch which includes opto-isolator means.

17. An emergency lighting system.as claimed in claim 1 wherein said inverter control means includes switch means at the input to said inverter;

means responsive to at least a first selected one of said controls for enabling said switch to pass a DC signal to said inverter, whereby said inverter may operate said one lamp; and means responsive to at least a second selected one of said controls for providing a DC current sink to inhibit the enabling of said switch by said first selected controls.

18. An emergency lighting system as claimed in claim 1 including no-load protection means for said inverter.

19. An emergency lighting system as claimed in claim 18 wherein said inverter is an oscillating inverter; and wherein said no-load protection means includes means connected in parallel with said lamp which means provides a substantially open circuit to the inverter output at the operating frequency of the lamp, but provides a load to the inverter when there is an open circuit at the lamp.

20. An emergency lighting system as claimed in claim 19 wherein said means connected in parallel includes a series circuit consisting of two capacitors with a load resistor therebetween, the circuit providing a higher frequency load to the inverter than the lamp.

21. An emergency lighting system as claimed in claim 1 including a second lamp, a second DC/AC inverter for operating at least said second lamp;

wherein the first inverter operates the first lamp; and wherein both of said inverters are normally powered from said AC power, the first inverter also being powered from the battery when AC power is not present.

22. An emergency lighting system as claimed in claim 1 including at least one ballast receiving said AC power; a second lamp; and means for normally operating at least said second lamp from said ballast.

23. An emergency lighting system as claimed in claim 22 including a second ballast receiving said AC power means for normally operating at least said one lamp from said second ballast; and means for protecting the inverter from undesired signals from said second ballast.

24. An emergency lighting system as claimed in claim 23 wherein said undesired signals are of a frequency lower than the frequency of the inverter when it is driving the first lamp, and wherein said means for protecting includes means for providing a lossy load to the undesired signal, which load is substantially reduced at the frequency of the inverter signals.

25. An emergency lighting system as claimed in claim 23 wherein said means for protecting includes means for providing a lossy load to said undesired signals.

26. An emergency lighting system as claimed in claim 1 including a starter strip for said one lamp; and means for driving the starter strip from the inverter, whereby the same inverter may be utilized to start and drive said lamp when the lamp is being operated from the battery.

27. An emergency lighting system as claimed in claim 1 wherein said inverter and a step-down DC converter source means are formed as a single integral unit;
  means for applying AC source to said integral unit;
  means for utilizing an AC output from the unit to operate said one lamp; and
  means for utilizing a DC output from the unit to charge the battery.

28. An emergency lighting system as claimed in claim 27 wherein said unit includes means for inverting a DC input signal applied from said battery to an AC signal of suitable frequency to operate said lamp.

29. In an electrical lighting circuit in which a gas discharge light is powered by a DC power source, said lighting circuit including a DC/AC inverter for converting DC power from said source into AC power, said DC/AC inverter generating AC power at a first frequency when powering said light and at a second frequency when said light is disconnected from said lighting circuit and means for applying said AC power to said light, a no-load protection circuit for preventing damage to said DC/AC inverter if said light is removed from lighting circuit, said no-load protection circuit comprising:
  frequency-sensitive means connected in parallel with said light, said frequency-sensitive means having a sufficiently high first impedance at said first frequency so that little power is dissipated in said frequency-sensitive means and said frequency-sensitive means having a second impedance at said second frequency so that said frequency-sensitive means provides a load to said AC power at said second frequency.

30. In an electrical lighting circuit in which a gas discharge light is powered by a DC power source, the no-load protection circuit according to claim 29 in which said frequency-sensitive means comprises at least one capacitor connected in series with a resistor, said capacitor and said resistor being connected in parallel with said light.

31. An electrical lighting circuit for powering a gas discharge light from a DC power source, said lighting circuit comprising:
  a DC/AC inverter for converting DC power from said source into AC power, said DC/AC inverter generating AC power at a first frequency when powering said light and at a second frequency when said light is disconnected from said lighting circuit;
  means for applying said AC power to said light; and
  frequency-sensitive means connected in parallel with said light, said frequency-sensitive means having a sufficiently high first impedance at said first frequency so that little power is dissipated in said frequency-sensitive means and said frequency-sensitive means having a second impedance at said second frequency so that said frequency-sensitive means provides a load to said AC power at said second frequency for preventing damage to said DC/AC inverter if said light is removed from lighting circuit.

32. An electrical lighting circuit according to claim 31 in which said frequency-sensitive means comprises at least one capacitor connected in series with a resistor, said capacitor and said resistor being connected in parallel with said light.

33. An electrical lighting circuit according to claim 32 wherein said frequency-sensitive means comprises a first capacitor, a resistor and a second capacitor connected in series.

34. An electrical lighting circuit according to claim 33 wherein said DC/AC inverter comprises a free-running oscillator having an oscillation frequency which is inversely related to oscillator load impedance.

35. In an electrical lighting circuit in which a gas discharge light is powered by an AC power source operating at a first frequency by means of a ballast which generates electrical noise and by a DC power source in the absence of AC power, said lighting circuit including a DC/AC inverter for converting DC power from said DC power source into AC power at a second frequency which is substantially higher than said first frequency, said ballast and said DC/AC inverter being directly connected to said light, the improvement comprising:
  frequency-sensitive means connected in series with said light and said DC/AC inverter, said frequency-sensitive means having a first impedance at said first frequency so that said frequency-sensitive means tends to block said noise and said first frequency signals and to prevent said noise and said first frequency signals from being applied to said DC/AC inverter and said frequency-sensitive means having a second impedance at said second frequency so that the loss caused by said frequency-sensitive means in series with said light is reduced at said second frequency.

36. In an electrical lighting circuit, the improvement according to claim 35 in which said frequency-sensitive means comprises at least one capacitor connected in parallel with a resistor, said capacitor and said resistor being connected in series with said light and said DC/AC inverter.

37. An electrical lighting circuit in which a gas discharge light is powered by an AC power source operating at a first frequency and by a DC power source int he absence of AC power, said lighting circuit comprising:
  a ballast connected in series with said AC power source and said light, said ballast generating electrical noise;
  a DC/AC inverter for converting DC power from said DC power source into AC power at a second frequency which is substantially higher than said first frequency, said DC/AC inverter being directly connected in parallel with said light; and
  frequency-sensitive means connected in series with said light and said DC/AC inverter, said frequency-sensitive means having a first impedance at said first frequency so that said frequency-sensitive means tends to block said noise and said first frequency signals and to prevent said noise and said first frequency signals from being applied to said DC/AC inverter and said frequency-sensitive means having a second impedance at said second frequency so that the loss caused by said frequency-sensitive means in series with said light is reduced at said second frequency.

38. An electrical lighting circuit according to claim 37 in which said frequency-sensitive means comprises at least one capacitor connected in parallel with a resistor, said capacitor and said resistor being connected in series with said light and said DC/AC inverter.

39. An electrical lighting circuit according to claim 38 wherein said DC/AC inverter comprises a free-running transistor oscillator having an output circuit and wherein said frequency-sensitive means further comprises means for preventing signals at said first frequency from reaching said oscillator and means for polarizing said noise so that said transistor oscillator is not damaged thereby.

40. An electrical lighting circuit according to claim 39 wherein said output circuit is connected to said light and said preventing means comprises a capacitor connected in series with said output circuit and said light.

41. An electrical lighting circuit according to claim 39 wherein said polarizing means comprises a diode connected in series with said output circuit and said light so that only noise signals of a selected polarity reach said output circuit.

42. An electrical lighting circuit in which a first gas discharge light is powered by an AC power source and a second gas discharge light is powered by a DC power source, said lighting circuit comprising:
  means connecting said first light to said AC power source to operate said first light from said AC source;
  switch means connected in series with said AC power source and said first light to turn said first light on and off;
  a DC/AC inverter for converting DC power from said DC power source into AC power, said DC/AC inverter comprising a free-running oscillator controlled by a feedback loop;
  means for connecting said DC/AC inverter to said second light to operate said second light from said DC/AC inverter;
  means connected in said feedback loop and responsive to the presence of AC power at said first light for controlling said oscillator to operate and generate AC power to operate said second light.

43. An electrical lighting system according to claim 42 wherein said DC power source comprises an AC/DC converter connected to said AC power source for generating DC power to turn said DC/AC inverter.

44. An electrical lighting system according to claim 43 wherein said DC power source further comprises a battery for generating DC power to run said DC/AC inverter in the absence of AC power from said AC source.

* * * * *

UNITED STATES PATENT AND TRADEMARK OFFICE
CERTIFICATE OF CORRECTION

PATENT NO. : 4,977,351
DATED : December 11, 1990
INVENTOR(S) : Bavaro et al.

It is certified that error appears in the above—identified patent and that said Letters Patent is hereby corrected as shown below:

Col. 15, line 18 - before "one" insert -- said --.

Col. 15, line 63 - delete "mode mean" and substitute -- means --.

Col. 18, line 40 - delete "int he" and substitute -- in the --.

Col. 20, line 18 - delete "turn" and substitute -- run --.

Signed and Sealed this

Twenty-fifth Day of August, 1992

Attest:

DOUGLAS B. COMER

*Attesting Officer*   Acting Commissioner of Patents and Trademarks